United States Patent [19]

Pincoffs et al.

[11] Patent Number: 4,739,331

[45] Date of Patent: Apr. 19, 1988

[54] CHANNELIZED RECEIVER CONTINUOUS WAVE RADAR SYSTEM

[75] Inventors: Peter H. Pincoffs, Severna Park; Raymond G. Martin, Ellicott City, both of Md.

[73] Assignee: Westinghouse Electric Corp., Pittsburgh, Pa.

[21] Appl. No.: 785,813

[22] Filed: Oct. 9, 1985

[51] Int. Cl.⁴ ............................................. G01S 13/32
[52] U.S. Cl. ...................................... 342/175; 342/200
[58] Field of Search ............... 342/159, 128, 194, 200, 342/19, 131–132, 175

[56] References Cited

U.S. PATENT DOCUMENTS

| | | | |
|---|---|---|---|
| 3,188,637 | 6/1965 | Mortley | 342/132 |
| 3,212,087 | 10/1965 | Blass et al. | 342/131 |
| 3,278,936 | 10/1966 | Wolf | 342/19 |
| 3,344,426 | 9/1967 | Long | 342/132 |
| 3,981,012 | 9/1976 | Brault et al. | 342/19 |
| 4,042,925 | 8/1977 | Albanese et al. | 342/194 |
| 4,122,452 | 10/1978 | Richmond | 342/19 |
| 4,176,351 | 11/1979 | DeVita et al. | 342/128 |

OTHER PUBLICATIONS

Radar Handbook, M. I. Skolnik 1970, pp. 29-16.

Primary Examiner—T. H. Tubbesing
Assistant Examiner—Mark Hellner
Attorney, Agent, or Firm—R. P. Lenart

[57] ABSTRACT

A continuous wave radar system arrangement for improving the dynamic range of the radar receiver. The transmitted carrier signal is frequency modulated by a periodic sawtooth waveform causing a predetermined peak frequency shift. The radar receiver includes a plurality of separate receiving channels each selective to a small portion of the transmitted bandwidth. As the sawtooth modulation causes the carrier signal to sweep in frequency, the received leakage and clutter signals in the selective receiving channels are blocked momentarily and individually in each channel. The outputs of the separate receiving channels are combined to form a composite signal of the echo returns. Gaussian filters with quadratic phase compensation are used to provide the selectivity of the receiving channels.

11 Claims, 2 Drawing Sheets

CHANNELIZED RECEIVER CONTINUOUS WAVE RADAR SYSTEM

BACKGROUND OF INVENTION

This invention relates, in general, to radar systems and, more specifically, to radar systems using continuous wave transmissions and to processing techniques for increasing the dynamic range of the radar receiver.

Continuous wave (CW) radar systems operate with a constant amplitude transmitted signal usually phase or frequency modulated by a predetermined waveform to aid in measuring the time delay of the echo signals. Since the signal is always being transmitted, as opposed to pulse radar systems, sufficient isolation must exist between the transmitted signal and the received echo signals. Using separate transmitting and receiving antennas is helpful, but additional cancelling of the transmitted signal is needed. Filters and phase reversal cancellation techniques are commonly used for this purpose, but still a significant amount of energy leaks from the transmitter to the receiver circuits. As a consequence thereof, receiver circuits have been required to exhibit large dynamic ranges in order to handle both the relatively weak echo signals and the relatively strong leakage and short range clutter signals.

Traditional filtering and phase reversal cancellation techniques for reducing the leakage and clutter signals often require apparatus having precisely maintained electrical and/or mechanical parameters. The problem is complicated by the desire to increase the range of CW radar systems, thus requiring more transmitted power and either more filtering or cancellation, which is already at the practical limit. The problem is mitigated by using radar receivers capable of wide dynamic range which adequately process the weak echo signals along with the strong leakage and clutter signals. Therefore, it is desirable, and it is an object of this invention, to provide a CW radar system which has wide dynamic receiver response.

Several issued patents describe radar systems which use some of the techniques taught by the invention disclosed herein. U.S. Pat. No. 3,344,426, issued Sept. 26, 1967, describes a radar system which uses chirp or variable frequency modulation with multiple receiving channels for the purpose of changing the illumination energy at each elevation angle of a stacked beam radar system. The present invention varies the modulation frequency of a continuous wave radar transmitter substantially in a linear fashion and has other novel elements which distinguish over this patent.

U.S. Pat. No. 3,212,087, issued on Oct. 12, 1965, describes a pulsed radar system with range resolution enhancement provided by multiple receivers sensitive only to a portion of the pulse signal. The present invention achieves greater dynamic range in a digital radar receiver by blocking out receiving channels in synchronism with the original modulation, and by other features to be described in detail later herein.

U.S. Pat. No. 3,188,637, issued on June 8, 1965, describes a radar system which utilizes chirp modulation, narrow band filtering sections, and gating circuits. The receiving mixers are injected with a chirp or linearly variable sawtooth signal which, when mixed with the echo signals, produces a fixed, not varying, intermediate frequency which is applied to the filters. The present invention uses the linear swing of the radar signal to successively apply the signal to different receiving channels which are selective to different frequencies. This could not be done according to the teachings of the reference patent since the IF signal frequency is constant.

SUMMARY OF THE INVENTION

There is disclosed herein new and useful radar arrangements for increasing the dynamic range of continuous wave radar system receivers. According to one specific embodiment of the invention, the radar transmitter frequency modulates the continuous wave carrier signal with a chirp modulating signal having a sawtooth waveform. The radar receiving system includes a plurality of separate receiving channels arranged so that each is selected to a small portion of the bandwidth of the transmitted signal. Gating or blocking circuits in each selective receiving channel blank or attenuate the strong leakage and clutter signals for the short period of time that the instantaneous frequency of the transmitted signal is at or near the frequency band at which the receiving channel is responsive. Each receiving channel further processes the radar signal into I and Q components and combines the signals from all of the receiving channels coherently to form a composite signal representative of the information contained in the complete bandwidth of the radar signal.

The selectivity of the separate receiving channels is provided by gaussian filters which have quadratic phase compensation. The modulating waveform may be modified by a small amount of amplitude modulation, thereby enhancing the performance of the system. Additional improvement may be realized by generating the flyback portion of the sawtooth modulating waveform in such a way that it produces a phase change of 180° in the carrier frequency between the end of one sawtooth sweep and the beginning of the next sweep.

BRIEF DESCRIPTION OF THE DRAWINGS

Further advantages and uses of this invention will become more apparent when considered in view of the following detailed description and drawings, in which.

DESCRIPTION OF THE PREFERRED EMBODIMENTS

Figure 1:
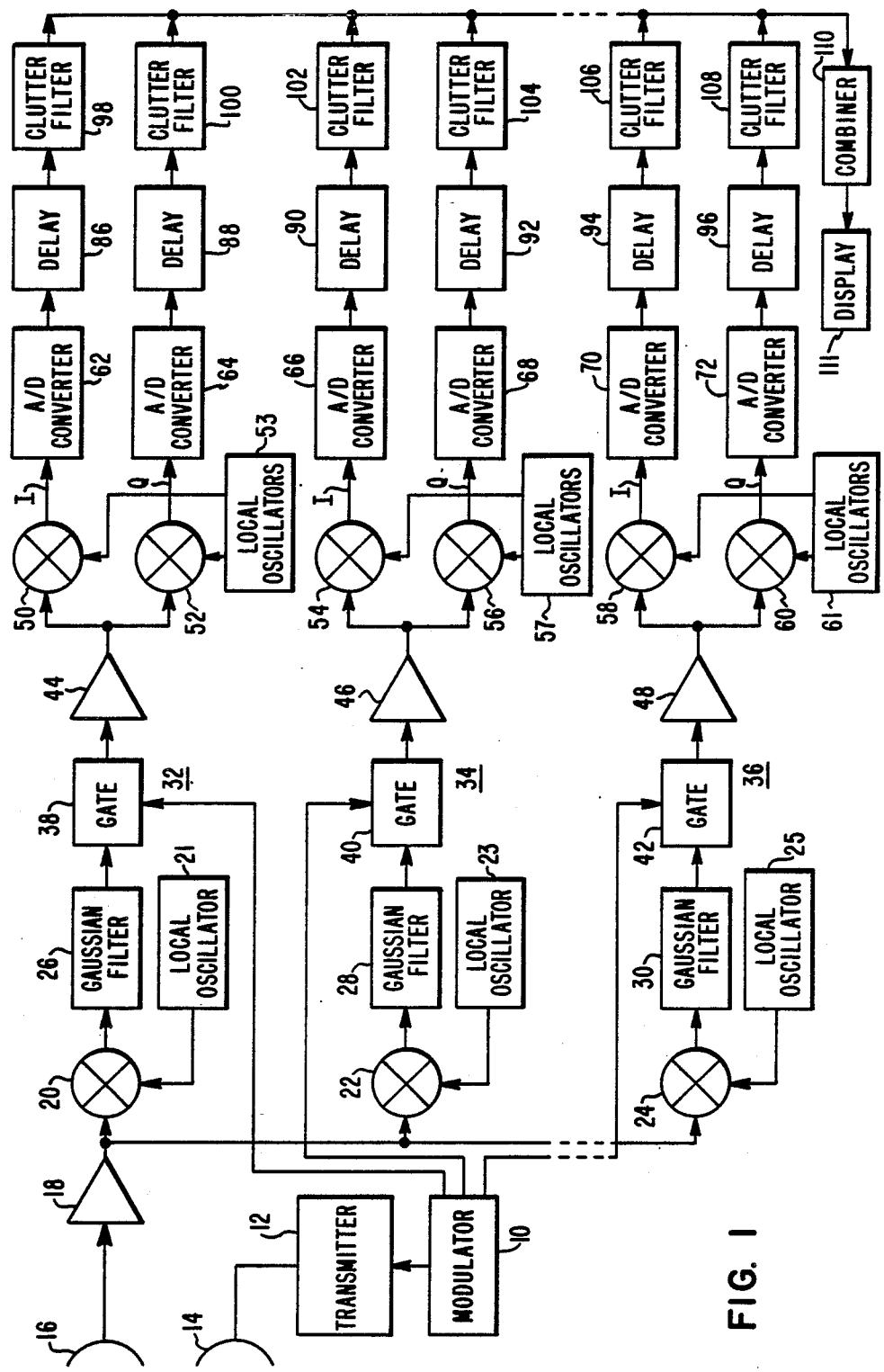
FIG. 1 is a block diagram illustrating a radar system constructed according to a specific embodiment of this invention.

Throughout the following description, similar reference characters refer to similar elements or members in all of the figures of the drawing.

Referring now to the drawing, and to FIG. 1 in particular, there is shown a block diagram of a radar system constructed according to a specific embodiment of this invention. The modulator 10 controls the modulation characteristics of the radar transmitter 12 as will be described in more detail in the discussion of FIG. 2. The output signals from the transmitter 12 are applied to the transmitting antenna 14. Received echo signals are picked-up or captured by the antenna 16 and applied to the RF amplifier 18.

The radar transmitter 12 operates in the continuous wave mode with a carrier frequency normally in the thousands of megahertz. The modulator 10 generates the modulating signal which is used to modulate the carrier signal of the transmitter 12. According to this specific embodiment of the invention, the modulation waveform takes the form of frequency modulation by a sawtooth wave which is sometimes described as "chirp" modulation.

The returned echo signals are amplified by the RF amplifier 18 and applied to the mixers 20, 22 and 24, whose outputs are applied to the gaussian filters 26, 28 and 30, respectively. Each combination of a mixer and a gaussian filter, and other components to be described later, form a separate section, receiver, or receiving channel, such as receiving channels 32, 34 and 36. The dashed lines in FIG. 1 associated with receiving channel 36 indicate that the number of parallel sections or channels can be different than the three channels shown in FIG. 1 without departing from the teachings of the invention. A typical system, constructed according to this invention, could have, for example, 16 to 20 of such receiving channels.

Figure 2:
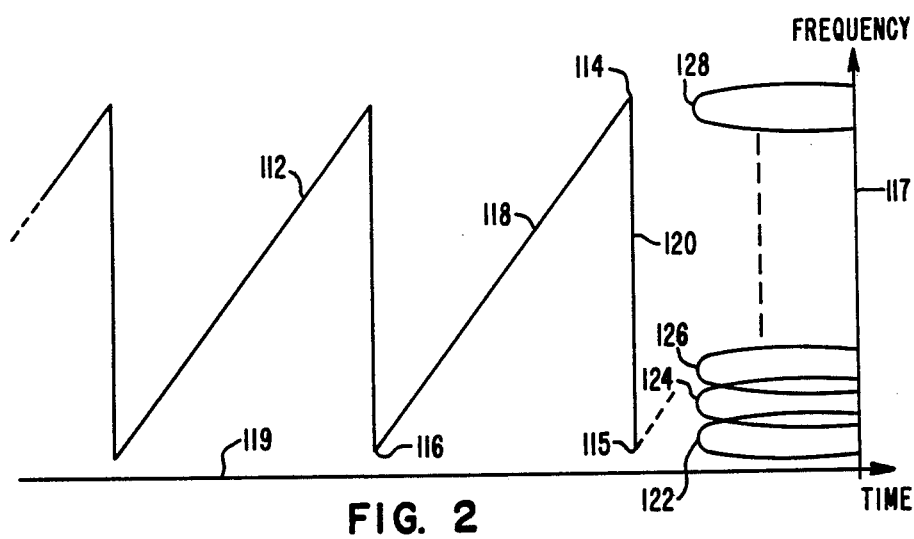
FIG. 2 is a graph illustrating the modulating waveform and the relative selectivity of the receiving channels of the system shown in FIG. 1.

Departing from FIG. 1 temporarily, FIG. 2 illustrates the sawtooth or chirp modulating waveform 112 which the radar system uses to modulate the carrier frequency. Axis 117 is the frequency axis and axis 119 is the time axis. Accordingly, waveform 112, when applied as modulation to the carrier signal, produces a linear excursion of the carrier frequency between a lower frequency limit 116 and an upper frequency limit 114. On the sweep portion 118 of the waveform 112, the frequency is increasing linearly, and on the flyback portion 120 of the waveform 112, the frequency is decreasing rapidly with respect to time. The overall frequency excursion may typically be on the order of less than a few megahertz, with one megahertz used for descriptive purposes in this embodiment.

As the radar frequency is changed due to the modulation, the separate receiving channels are scanned by the predominant echo frequencies. That is to say that each receiving channel primarily responds to a finite portion of the overall bandwidth of the radar signal. Referring back to FIG. 1, the receiving channels 32, 34 and 36 may each be responsive to 1/20th of the main signal bandwidth when twenty channels are employed. In such a system, each channel would be designed to have a bandwidth of approximately fifty kilohertz when the overall bandwidth is one megahertz.

The different channel responses can be accomplished by various means. In this specific embodiment, each channel is similar to the other channels after the mixers 20, 22 and 24, since the local oscillators 21, 23 and 25 have frequencies carefully selected to divide the incoming signal into discrete channels having the same IF frequencies. Thus, filters 26, 28 and 30 all have the same frequency response. An alternative to this would be to have the filters responsive to different frequencies and maintain the local oscillators at the same frequency. The former arrangement offers the advantage of using similar components for each receiving channel apart from the local oscillator frequency.

Referring again to FIG. 2, the selectivity of the receiving channels is illustrated by curves 122, 124, 126 and 128, whether the selectivity is by similar filters and different mixer injection signals, or by similar mixer injection frequencies and different filter responses. With a twenty channel system, eighteen additional response curves would be included between the curves 122 and 128, instead of just the two shown in FIG. 2. Response curves 122 and 128 are at opposite ends of the frequency swing and represent the extremes of frequency to which the multi-channel receiver system is called upon to respond.

According to FIG. 1, channel 32 includes a gate 38 which is synchronized to or controlled by the modulator 10 in accordance with the position or value of the modulating signal. Gates 40 and 42 of sections 34 and 36, respectively, are similarly synchronized. The gates in each channel are capable of blanking, blocking or attenuating the signal from their respective filter as directed by the modulator timing. Generally, the gates 38, 40 and 42 are timed such that the transmitted signal leakage and return clutter are attenuated or blocked from progressing further through the receiving channel. This can occur when the frequency of the radar signal is of the correct value to match the receiving channel. The blocking timing is described later herein in more detail.

When signals are not blocked by the gate 38, they are applied to the IF amplifier 44. The mixers 50 and 52, together with the local oscillators 53, mix the IF signal to produce the in-phase (I) and quadrature (Q) components of the IF signal. Each component IF section includes analog-to-digital (A/D) converters 62 and 64, delays 86 and 88, and clutter filters 98 and 100. The dynamic range requirement, or the number of bits of resolution, of the A/D converters 62 and 64 is reduced by the gating action of the gate 38 in blocking the large amplitude signals. Thus, the A/D converters used can be of conventional design typical of those commonly used for processing I and Q channels. The delays 86 and 88 delay the signal from each receiver section so that the final processing will having the target echoes from all sections aligned properly in time. Clutter filters 98 and 100 filter out the ground clutter echo signals.

Similar elements form the other two illustrated receiving channels. These include gates 40 and 42, IF amplifiers 46 and 48, mixers 54, 56, 58 and 60, local oscillators 57 and 61, A/D convertes 66, 68, 70 and 72, delays 90, 92, 94 and 96, and clutter filters 102, 104, 106 and 108. The operation of each of these elements is similar to the operation of corresponding elements in the receiving channel 32, except that the gates are timed differently as will be described later in more detail. The outputs from the clutter filters are processed in the combiner 110 by discrete or fast Fourier transform techniques to combine the individual limited bandwidth receiving channels into the composite output signal corresponding to the bandwidth of the originally transmitted radar signal. The resulting signal is further processed and displayed by the display 111.

Assuming that the radar system shown in FIG. 1 has twenty separate receiving channels, the delay of the first channel 32 provided by the delays 86 and 88 can be calculated by the equation:

$$D = \frac{N-1}{NF_r}$$

where
$D$ = delay
$F_r$ = FM repetition rate
$N = 20$

The time delay for the delay elements 90 and 92 would be provided by the equation:

$$D = \frac{N-2}{NF_r}$$

The delay of the delay elements 94 and 96, being in the last receiving channel 36, would be equal to zero.

Again assuming that the radar system shown in FIG. 1 has twenty separate receiving channels, the frequency of the local oscillator 21 can be calculated by the equation:

$$F_o = F_c - F_i - \frac{N-1}{2}\Delta F$$

where
$F_o$=local oscillator frequency
$F_c$=carrier frequency
$F_i$=IF center frequency
$\Delta F$=channel frequency separation
N=20

The frequency of the local oscillator 23 is given by the equation:

$$F_o = F_c - F_i - \frac{N-3}{2}\Delta F$$

The frequency of the next to highest frequency local oscillator is then given by the equation:

$$F_o = F_c - F_i + \frac{N-3}{2}\Delta F$$

and the frequency of local oscillator 25 is found from the equation:

$$D = \frac{N-2}{NF_r}$$

The filters 26, 28 and 30, in order to function properly with this specific embodiment, must have a well controlled transient response such as provided by a gaussian filter. A gaussian filter is defined by the equation:

$$F(\omega) = e^{-\alpha\omega^2}$$

where
$F(\omega)$=the amplitude response with changing frequency
e=transcendental constant (2.718)
$\alpha$=design constant
$\omega$=frequency in radians/sec. from filter center frequency For a 50 kilohertz bandwidth, the design constant $\alpha$ is calculated to have a value of $1.405 \times 10^{-11}$.

In order to reduce the response time duration of the filter to give a better response for functioning as a filter in a receiving channel of the present invention, it is desirable and an improvement over conventional filters to add quadratic phase compensation to the filter response. A gaussian filter with quadratic phase compensation is defined by the equation:

$$F_q(\omega) = e^{-\alpha\omega^2} e^{jb\omega^2}$$

where, in addition to the quantities already defined,
b=design constant
j=complex number notation symbol The first exponential term of the equation represents the gaussian response and the second exponential term represents the quadratic phase compensation. The frequency response representation of the quadratic phase of a linear FM signal is given by the equation:

$$\theta_1 = \pi D((\omega_c - \omega))/\Delta\omega^2$$

where $D = T\Delta F$.

In order for the gaussian filter to compensate for the quadratic phase in the above equation, $b\omega^2$ from the filter equation must be set equal to $\theta_1$. By evaluating the equations for $\omega_c = 0$, $T = 400 \times 10^{-6}$ seconds, and $\Delta F = 1 \times 10^6$ hertz, b is calculated to be:

$$b = \frac{1 \times 10^{-10}}{\pi}$$

Figure 3:
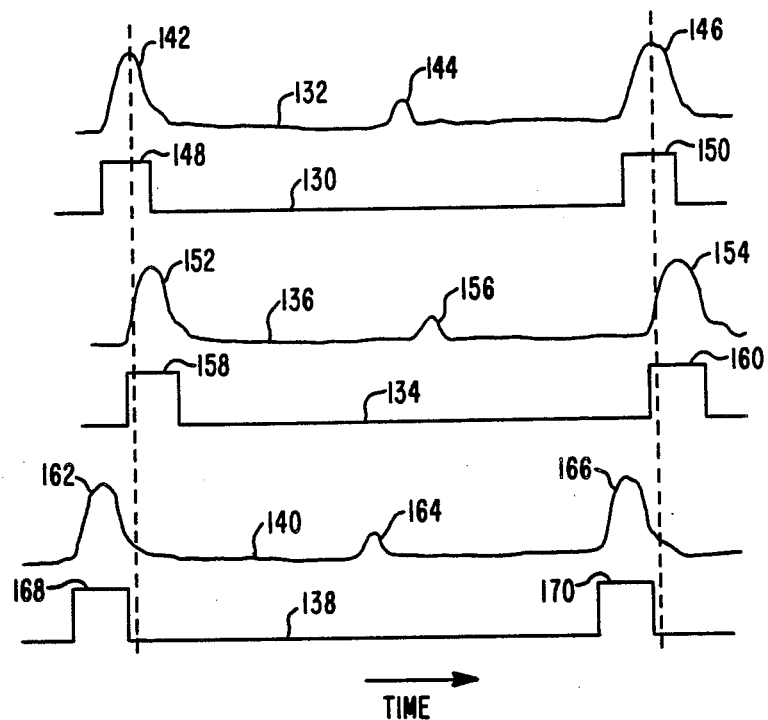
FIG. 3 is a diagram showing the relationship of echo, leakage, and blocking signals which are developed in the radar system shown in FIG. 1.

As has already been explained, the linear progression of the radar frequency provided by the sawtooth modulation causes the signal to pass through each of the channel passbands. As this occurs, the transmitter leakage and clutter echoes will generate high amplitude signals of comparative short duration. These signals occur successively in each channel, as indicated in FIG. 3. Traces or curves 130 and 132 correspond to receiving channel 32 in FIG. 1, curves 134 and 136 correspond to receiving channel 34, and curves 138 and 140 correspond to receiving channel 36.

According to FIG. 3, curve 132 represents the signal, as a function of time, applied to the first receiving channel. The voltage peaks 142 and 146 are due to the leakage and clutter passing through the gaussian filter 26. Voltage peak 144 represents a return from a target. The blanking or blocking pulse 148 is synchronized by the radar system to blank out the strong pulse 142 since it will have amplitude greater than that which can be processed by the elements of the receiving channel, particularly the A/D converters. The target return 144 is not blocked since the amplitude thereof is within the capability of the receiving channel elements and since it is this peak that we actually want to detect and process. In effect, all portions of the signal from filter 26 are available for processing except the portion blocked by the pulse 148. Pulse 150 blocks the peak 146, which occurs on the next cycle or repetition of the radar signal frequency sweep.

The voltage peaks 152 and 154 and the target peak 156 correspond to the signals in the second receiving channel 34. The pulses 158 and 160 are used to block the corresponding peaks in the second receiving channel. The other channels would have similar signal and blocking pulse relationships progressively delayed in time from channel to channel. The last channel would have relationship indicated by the peaks 162, 164 and 166 and the pulses 168 and 170. All of the receiving channel pulses are synchronized to the modulation waveform since it determines the frequency of the radar signal and, hence, the time at which the large leakage and clutter peaks will be at the frequency recognized by the particular receiving channel. Therefore, by blanking the signals in the individual channels when they exceed allowable levels, high amplitude signals are kept out of the A/D converters while still leaving a high percentage of time devoted to useful listening for target echoes. Consequently, the dynamic range of the overall receiver is enhanced by the system described herein.

An improvement in the operation of the radar system constructed according to this invention is obtained when the frequency modulation is such that the flyback introduces a carrier frequency phase change of 180°. For example, during the flyback portion or transition 120, shown in FIG. 2 from limit 114 to limit 115, the carrier will be changed in phase by 180°. The desired modulation is provided by the modulator 10 of FIG. 1, and methods for implementing such end-to-end alignment of the modulation signal wth the carrier signal are well known and obvious to those skilled in the art.

Analysis has shown that a 25 db improvement in dynamic range can be achieved by a radar system constructed according to this invention over conventional CW radar systems. This degree of improvement is based upon sixteen receiving channels spanning 80% (100 kilohertz to 900 kilohertz) of a one megahertz chirp waveform, with one db loss and approximately 6.5% eclipsing.

It is emphasized that numerous changes may be made in the above described system without departing from the teachings of the invention. It is intended that all of the information contained in the foregoing description, or shown in the accompanying drawings, will be interpreted as illustrative rather than limiting.

We claim as our invention:

1. A radar system comprising:
   means for transmitting a continuous wave carrier frequency signal;
   means for modulating the transmitted carrier frequency signal with a sawtooth modulating waveform having sweep and flyback portions;
   means for capturing echo and clutter signals resulting from the transmitted signal;
   a plurality of receiving channels each being responsive to only a portion of the bandwidth of the transmitted signal;
   means for applying the captured signals and transmitter leakage signals to said plurality of receiving channels, said applying means preserving the frequency swing characteristics of said captured and leakage signals;
   means for attenuating the signals in said receiving channels when the frequency of the transmitted signal is substantially equal to the frequency at which the receiving channel is responsive; and
   means for combining the signals processed by said plurality of receiving channels to form a composite signal representative of the echoes returned over the complete bandwidth of the transmitted signal.

2. The radar system of claim 1 wherein each separate receiving channel includes an analog-to-digital converter in the signal processing path after the attenuating means.

3. The radar system of claim 1 wherein the means for applying the captured signals to the receiving channels includes a plurality of signal mixers.

4. The radar system of claim 3 wherein each of said mixers is injected by a local oscillator signal of a different frequency.

5. The radar system of claim 1 wherein the selectivity of said receiving channels with respect to the overall transmitted bandwidth is determined by gaussian filtered with gaussian response characteristics.

6. The radar system of claim 5 wherein the gaussian filters have response characteristics with quadratic phase compensation.

7. The radar system of claim 1 wherein the entire flyback transition of said sawtooth modulating waveform generates substantially 180° of phase shift of the carrier signal.

8. The radar system of claim 1 wherein the sawtooth modulating waveform is modified by the application of amplitude modulation to the sawtooth waveform.

9. The radar system of claim 1 wherein the combining means includes means for using Fourier transform processing techniques.

10. A radar system comprising:
    means for transmitting a continuous wave carrier frequency signal;
    means for frequency modulating the transmitted carrier frequency signal with a sawtooth modulating waveform having sweep and flyback portions;
    means for capturing echo and clutter signals resulting from the transmitted signal;
    a plurality of receiving channels each containing a gaussian filter with gaussian response characteristics and an analog-to-digital converter;
    means for mixing the captured signals and applying the resulting signals to said receiving channels, with the injection frequencies of said mixing means and the frequency of the passband of said gaussian filters being selected to make said separate receiving channels responsive to only a portion of the bandwidth of the transmitted signal, and with said gaussian filters having response characteristics with quadratic phase compensation;
    means for attenuating the signals in a specific receiving channel when the frequency of the transmitted signal is substantially equal to the frequency at which the receiving channel is responsive; and
    means for combining the signals processed by said plurality of receiving channels to form a composite signal representative of the echoes returned over the complete bandwidth of the transmitted signal.

11. The radar system of claim 10 wherein the entire flyback portion of said sawtooth modulating waveform generates substantially 180° of phase shift of the carrier signal.

* * * * *